J. E. NIX.
DRAFT ATTACHMENT.
APPLICATION FILED FEB. 2, 1915.
1,159,983.
Patented Nov. 9, 1915.
2 SHEETS—SHEET 1.
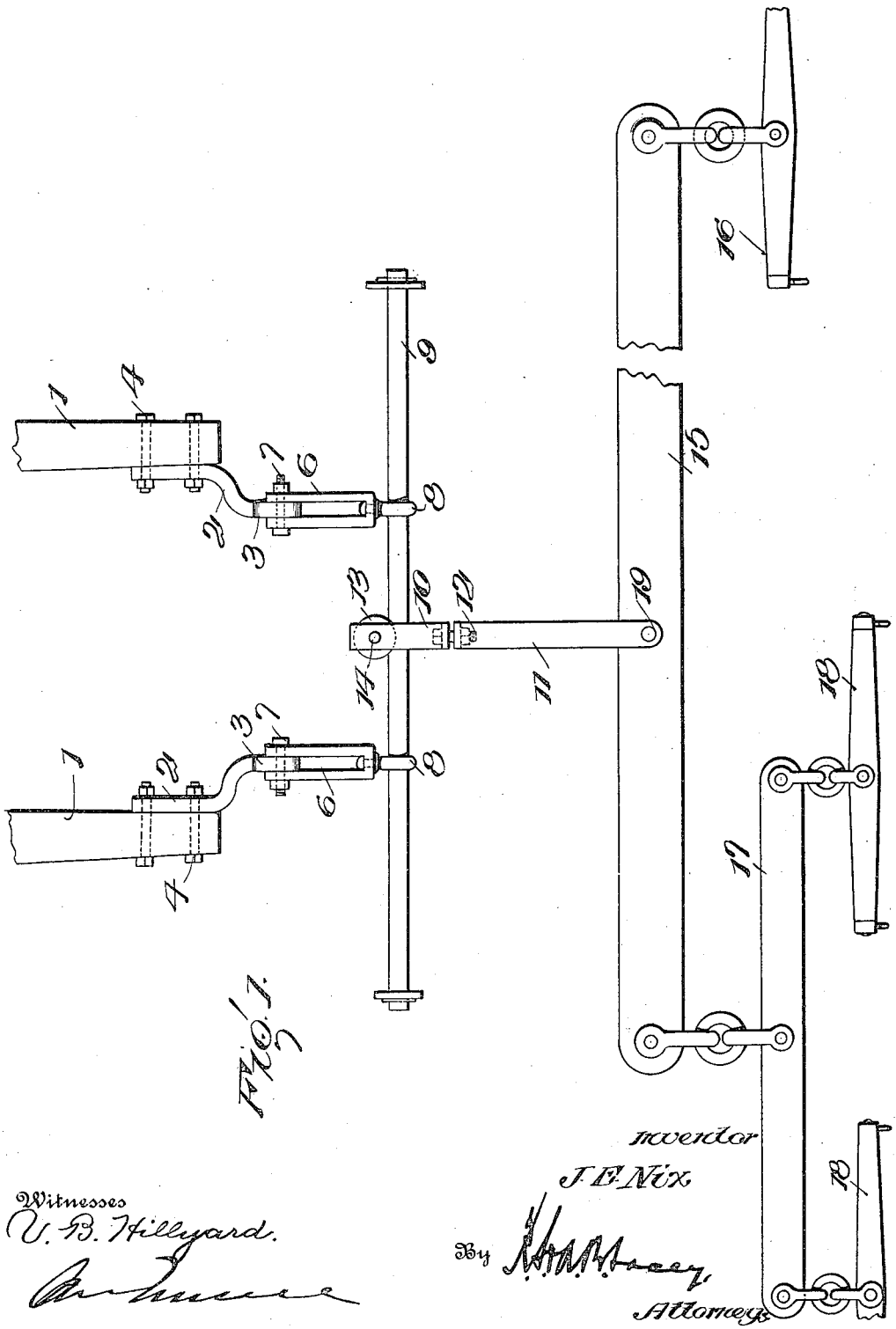
Witnesses
U. B. Hillyard.
Inventor
J. E. Nix
By
Attorney

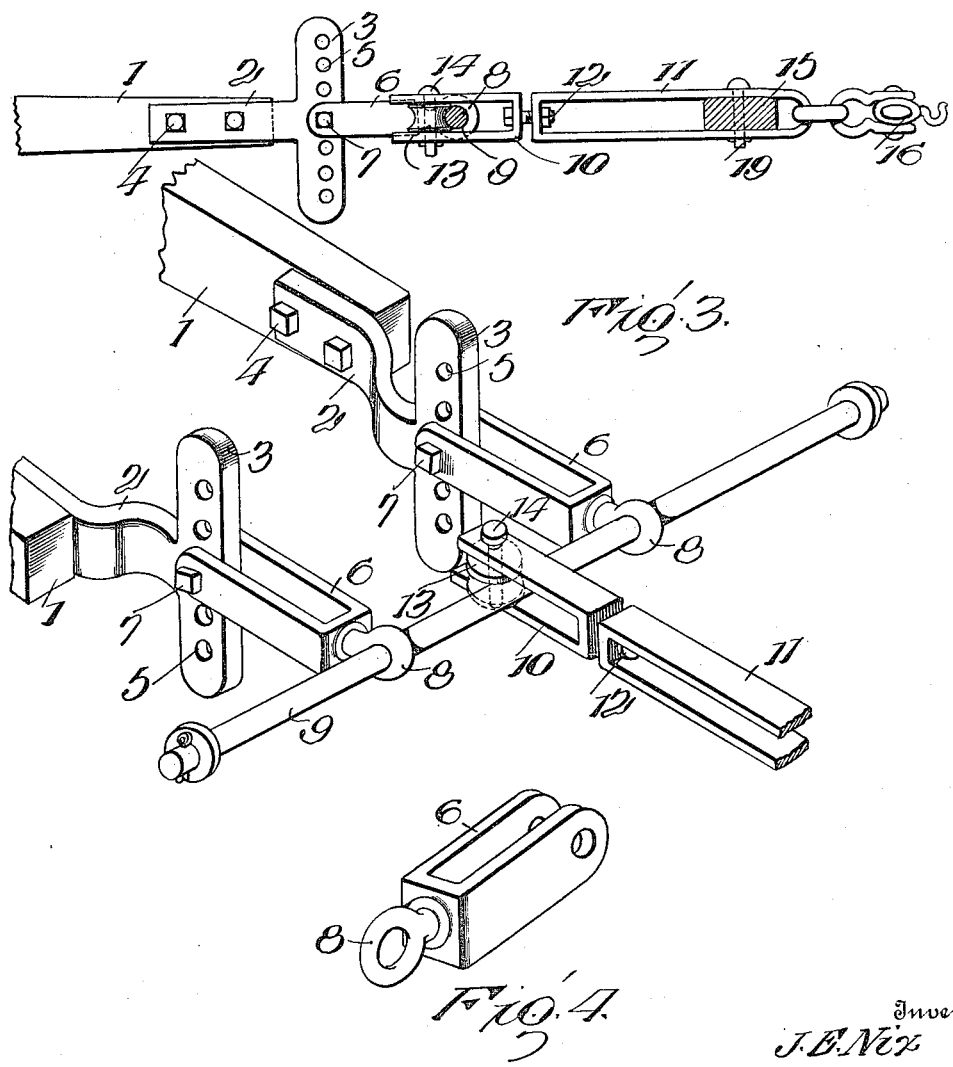

UNITED STATES PATENT OFFICE.

JOHN E. NIX, OF EATON, COLORADO, ASSIGNOR OF ONE-FOURTH TO A. J. SMILLIE, OF EATON, COLORADO.

DRAFT ATTACHMENT.

1,159,983.  Specification of Letters Patent.  Patented Nov. 9, 1915.

Application filed February 2, 1915. Serial No. 5,699.

*To all whom it may concern:*

Be it known that I, JOHN E. NIX, a citizen of the United States, residing at Eaton, in the county of Weld and State of Colorado, have invented certain new and useful Improvements in Draft Attachments, of which the following is a specification.

The primary object of this invention is the provision of a draft hitch intended more particularly for agricultural implements and specifically for two-way or gang plows, the purpose being to equalize the draft and overcome side stress and prevent binding of the draft rod in its bearings.

A further purpose of the invention is the provision of a hitch which equalizes and prevents side draft and at the same time enables the draft animals to be disposed in unequal number upon opposite sides of the draft connection whereby one of the draft animals may walk in the furrow and the remaining draft animals travel upon the unbroken ground.

The invention, furthermore, has for its object to provide a draft appliance which may be applied to the beams of gang plows or like implements in such a manner as to wholly overcome side stress and prevent binding of the parts and present a minimum space for the draft connection to move in.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings;—Figure 1 is a top plan view showing the invention applied to a pair of beams of a gang plow or like implement. Fig. 2 is a side view, the evener beam and draft rod being in section. Fig. 3 is a detail perspective view of the draft attachment, the forward portion of the draft connection being broken away and the equalizer omitted. Fig. 4 is a detail view of the clevis and swivel connection.

Corresponding and like parts are referred to in the following description and indicated in all the views of the drawings by the same reference characters.

The numeral 1 designates a pair of beams, such as are generally employed in two-way, or gang, plows. A draft attachment is secured to the front end of each of the beams 1 and comprises a longitudinal member 2 and a vertical member 3. The draft attachments are preferably secured to the inner or opposing faces of the beams 1 and are offset intermediate of their ends to throw the vertical members 3 inward into closer relation. The draft attachments are secured to the beams 1 by means of bolts 4 or like fastenings. The draft attachments are approximately of T-shape, the vertical members 3 being provided in their length with a plurality of openings 5. These openings provide convenient means for adjusting the draft vertically according to the nature of the work and the result to be attained.

A clevis 6 is attached to each of the draft attachments by means of a bolt or like fastening 7, the same passing through openings formed in the side members of the clevis and through one of the openings 5 in the vertical member of the draft attachment. In this manner the clevis is adjustable vertically and is free to swing about the connection 7. An eye member 8 is connected with each of the clevises 6 by means of a swivel joint, such eye member embodying a shank which passes through an opening in the closed end of the clevis and has its rear end upset or enlarged to retain the eye member in place and yet admit of its turning to prevent binding of the draft rod 9 which is supported in the eye members.

The draft connection between the draft bar 9 and the equalizer comprises two members 10 and 11, each being of U-shape and connected by means of a bolt 12 which passes through openings formed in the closed ends of the members 10 and 11. The connection between the members 10 and 11 is such as to form in effect a swivel joint whereby the member 11 to which the equalizer is attached is adapted to oscillate in conformity to the movements of the equalizer. A small wheel 13 is mounted between the rear ends of the spaced parts comprising the member 10, a pin 14 passing through such parts and having the wheel 13 mounted thereon. The wheel 13 is grooved in its outer edge to receive the draft rod 9. It will thus be understood that the draft connection is adapted to move freely between the clevises.

The equalizer comprises an evener beam 15, a swingletree 16 and a double tree 17, the latter being provided at its ends with swingletrees 18. The equalizer is adapted for three horses and is so disposed as to admit of one of the horses walking in the furrow and the remaining two horses traveling upon the unbroken ground. The evener beam 15 is disposed between the front ends of the spaced parts comprising the member 11, a pin or bolt 19 serving to pivotally connect the evener beam to the member 11 of the draft connection. It is to be understood that the equalizer may be of any construction and arrangement.

It will be understood from the foregoing taken in connection with the accompanying drawings that the draft rod 9 is adapted to move in the eye members 8 without binding and that the draft connection is free to move on the draft rod to a limited extent without binding, hence the draft readily adapts itself to the load or strain, thereby avoiding side draft and at the same time equalizing the load upon the draft animals.

Having thus described the invention, what is claimed as new is:—

1. In a draft hitch, transversely spaced draft attachments of T shape arranged with one of their members in vertical position and provided in its length with a plurality of openings, a clevis for each draft attachment having connection with the vertical member thereof in a manner to be adjusted to different levels, eye members connected to the clevises by means of swivel joints, a draft rod mounted in the eye members and a draft connection mounted upon the draft rod.

2. In combination with two beams, draft attachments fastened to the forward ends of the beams and inwardly offset to bring the front ends closer together and having vertical members at their forward ends in which are formed a plurality of openings, clevises adjustable vertically and adapted to be secured in the adjusted position to the vertical members of the draft attachments, eye members attached to the clevises by means of swivel joints, a draft rod mounted in the eye members and a draft connection mounted upon the draft rod and adapted to move thereon.

3. A draft hitch comprising transversely spaced clevises, eye members attached to the clevises by means of swivel joints, a draft rod mounted in the eye members, a draft connection mounted upon the draft rod and comprising two members connected by means of a swivel joint and an equalizer attached to the forward end of the draft connection, a draft hitch comprising two draft attachments, clevises pivotally and vertically adjustably connected to the draft attachments, eye members attached to the clevises by means of swivel joints, a draft rod mounted in the eye members, a draft connection mounted upon the draft rod and movable thereon and comprising members joined by means of a swivel connection and an equalizer attached to the forward end of the draft connection.

In testimony whereof I affix my signature in presence of two witnesses.

JOHN E. NIX. [L. S.]

Witnesses:
  A. J. SMILLIE,
  C. J. STOCKFLETH.

Copies of this patent may be obtained for five cents each, by addressing the "Commissioner of Patents, Washington, D. C."